United States Patent
Hotta et al.

(10) Patent No.: US 8,188,993 B2
(45) Date of Patent: May 29, 2012

(54) LIQUID CRYSTAL DRIVE DEVICE, LCD APPARATUS AND DRIVE METHOD

(75) Inventors: Aira Hotta, Tokyo (JP); Haruhiko Okumura, Fujisawa (JP); Hironori Minamizaki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 679 days.

(21) Appl. No.: 12/405,410

(22) Filed: Mar. 17, 2009

(65) Prior Publication Data
US 2009/0289935 A1 Nov. 26, 2009

(30) Foreign Application Priority Data
May 20, 2008 (JP) .................................. 2008-132297

(51) Int. Cl.
*G06F 3/038* (2006.01)
*G09G 3/36* (2006.01)
*G09G 5/00* (2006.01)
*G06K 9/40* (2006.01)

(52) U.S. Cl. .......... 345/204; 345/87; 345/611; 345/618; 382/266

(58) Field of Classification Search ........................ None
See application file for complete search history.

(56) References Cited

U.S. PATENT DOCUMENTS
| | | | |
|---|---|---|---|
| 6,930,676 B2 * | 8/2005 | De Haan et al. | 345/204 |
| 7,397,457 B2 * | 7/2008 | Sugino et al. | 345/89 |
| 7,495,647 B2 * | 2/2009 | Tryhub et al. | 345/99 |
| 7,643,019 B2 * | 1/2010 | Velthoven et al. | 345/204 |
| 2003/0174110 A1 | 9/2003 | Baba et al. | |
| 2006/0280329 A1 | 12/2006 | Soga | |
| 2007/0279574 A1 | 12/2007 | Minamizaki et al. | |
| 2010/0033497 A1 * | 2/2010 | Ueno et al. | 345/611 |

FOREIGN PATENT DOCUMENTS
| | | |
|---|---|---|
| JP | 2003264846 | 9/2003 |
| JP | 2006098803 | 4/2006 |
| JP | 2007052127 | 3/2007 |
| JP | 2008009383 | 1/2008 |
| JP | 2009053510 | 3/2009 |

OTHER PUBLICATIONS

Baba, et al., Software-Processed Edge- and Level-Adaptive Overdrive (SELAO) Method for High-Quality Motion Picture, SID Digest, 2005, pp. 1492-1495.

* cited by examiner

*Primary Examiner* — Andrew L Sniezek
(74) *Attorney, Agent, or Firm* — Turocy & Watson, LLP (57) ABSTRACT

A liquid crystal drive device includes: a frame memory retaining image information of a second frame immediately preceding a first frame; a first calculator calculating a first difference between image information of the first frame and the image information of the second frame; an edge enhancement processor performing edge enhancement processing of the first frame for each of pixels of the first frame and outputting edge enhancement image information; a selector selecting and outputting the edge enhancement image information or image information of the first frame; a second calculator calculating a second difference between an output of the selector and the image information of the second frame; an enhancement coefficient calculator multiplying an output of the second calculator by an enhancement correction coefficient; and a third calculator calculating sum information by adding together an output of the enhancement coefficient calculator and the image information of the second frame.

18 Claims, 7 Drawing Sheets

FIG. 1

PIXEL TABLE

| $p_1$ | $p_2$ | $p_3$ |
|---|---|---|
| $p_4$ | $p_0$ | $p_5$ |
| $p_6$ | $p_7$ | $p_8$ |

FIG. 2

EDGE ENHANCEMENT FILTER TABLES

| $x_1$ | $x_2$ | $x_3$ |
|---|---|---|
| $x_4$ | $x_0$ | $x_5$ |
| $x_6$ | $x_7$ | $x_8$ |

(a)

| $y_1$ | $y_2$ | $y_3$ |
|---|---|---|
| $y_4$ | $y_0$ | $y_5$ |
| $y_6$ | $y_7$ | $y_8$ |

DIFFERENCE FILTERS

| 0 | 0 | 0 |
|---|---|---|
| 0 | 1 | -1 |
| 0 | 0 | 0 |

(a)

| 0 | 0 | 0 |
|---|---|---|
| 0 | 1 | 0 |
| 0 | -1 | 0 |

ROBERTS FILTERS

| 0 | 0 | 0 |
|---|---|---|
| 0 | 1 | 0 |
| 0 | 0 | -1 |

(a)

| 0 | 0 | 0 |
|---|---|---|
| 0 | 0 | 1 |
| 0 | -1 | 0 |

SOBEL FILTERS

| -1 | 0 | 1 |
|---|---|---|
| -2 | 0 | 2 |
| -1 | 0 | 1 |

(a)

| -1 | -2 | -1 |
|---|---|---|
| 0 | 0 | 0 |
| 1 | 2 | 1 |

PREWITT FILTERS

| -1 | 0 | 1 |
|---|---|---|
| -1 | 0 | 1 |
| -1 | 0 | 1 |

(a)

| -1 | -1 | -1 |
|---|---|---|
| 0 | 0 | 0 |
| 1 | 1 | 1 |

LAPLACIAN FILTERS

| 0 | -1 | 0 |
|---|---|---|
| -1 | 4 | -1 |
| 0 | -1 | 0 |

(a)

| 0 | 0 | 0 |
|---|---|---|
| 0 | 0 | 0 |
| 0 | 0 | 0 |

COMPARISON OF EDGE ENHANCEMENT FILTER EFFECTS

|  | DIFFERENCE | SOBEL | LAPLACIAN |
|---|---|---|---|
| CALCULATION QUANTITY | ◎ (4) | △ (12) | ○ (5) |
| EIFFEL TOWER | ◎ | ○ | ◎ |
| SYNTHETIC EVALUATION | ◎ | △ | ○ |

LIQUID CRYSTAL DRIVE DEVICE, LCD APPARATUS AND DRIVE METHOD

CROSS-REFERENCE TO RELATED APPLICATION

This application is based upon and claims the benefit of priority from prior Japanese Patent Application No. 2008-132297 filed on May 20, 2008 in Japan, the entire contents of which are incorporated herein by reference.

BACKGROUND OF THE INVENTION

1. Field of the Invention

The present invention relates to a liquid crystal drive device, a LCD apparatus and a drive method.

2. Related Art

In general, when a motion picture is displayed on the LCD, motion picture blurring occurs because of poor response characteristics of liquid crystal. In order to improve this, a technique for improving the response speed of the LCD by contriving a drive method has been developed (U.S. Pat. No. 7,106,286).

In the motion picture display, an area where an image does not move and an area where an image moves occur in many cases. In the still area where the image does not move, clear display is obtained because there is no motion picture blurring. In the motion picture area where the image has moved, the image looks blurring. Therefore, an edge detection enhancement drive technique of detecting an edge of an area where an image has moved by using the technique for detecting an edge area and applying stronger enhancement to the detected edge area is developed (USP Application 2006/0066554A1, or M. Baba et al., "Software Processed Edge-Level-Adaptive Overdrive Method for High-Quality Motion Picture," SID 05 Digest, pp. 1942-1945). Denoting an enhancement coefficient by $\alpha$, an enhancement correction coefficient in an edge part by $\beta$, a gray scale level value of a preceding frame by $L_0$, a gray scale level value of the current frame by $L_1$, and an enhancement drive gray scale level value by $L_{LAO}$, enhancement correction is conducted so as to satisfy the following equation in the ordinary enhancement drive method.

$$L_{LAO} = \alpha(L_1 - L_0) + L_0$$

According to an edge enhancement drive method described in U.S. Patent Application Laid-Open No. 2006/0066554A1, or M. Baba et al., "Software Processed Edge-Level-Adaptive Overdrive Method for High-Quality Motion Picture," SID 05 Digest, pp. 1942-1945), enhancement correction is conducted so as to satisfy the following equation.

$$L_{LAO} = \alpha\beta(L_1 - L_0) + L_0$$

According to the enhancement drive method using an edge detection technique described in USP Application 2006/0066554A1, or M. Baba et al., "Software Processed Edge-Level-Adaptive Overdrive Method for High-Quality Motion Picture," SID 05 Digest, pp. 1942-1945), excessive enhancement is applied to a detected edge area and consequently ringing noise or the like is apt to occur, and favorable motion picture characteristics are not obtained in some cases.

In portable devices such as portable telephones, low power dissipation, size reduction of the device, and weight reduction are in great demand and it is demanded to reduce the size of the liquid crystal drive device as well.

SUMMARY OF THE INVENTION

The present invention has been made in view of these circumstances, and an object thereof is to provide a liquid crystal drive device, a LCD apparatus and a drive method which bring about favorable motion picture characteristics and make the circuit scale small as far as possible.

According to an aspect of the present invention, there is provided a liquid crystal drive device including: a frame memory configured to retain image information of a second frame immediately preceding a first frame; a first calculator configured to calculate a first difference between image information of the first frame and the image information of the second frame; an edge enhancement processor configured to perform edge enhancement processing of the first frame for each of pixels of the first frame and outputting edge enhancement image information; a selector configured to select and output the edge enhancement image information when an absolute value of an output of the first calculator is at least a predetermined value and which selects and outputs image information of the first frame when the absolute value of the output of the first calculator is less than the predetermined value; a second calculator configured to calculate a second difference between an output of the selector and the image information of the second frame; an enhancement coefficient calculator configured to multiply the second difference by an enhancement correction coefficient; and a third calculator configured to calculate sum information by adding together an output of the enhancement coefficient calculator and the image information of the second frame, wherein a liquid crystal panel is driven on the basis of the sum information.

According to another aspect of the present invention, there is provided a LCD apparatus including: a liquid crystal panel; and the liquid crystal drive device according to the aspect which drives the liquid crystal panel.

According to another aspect of the present invention, there is provided a drive method including: retaining image information of a second frame immediately preceding a first frame in a frame memory; computing a first difference between image information of the first frame and the image information of the second frame; conducting edge enhancement processing of the first frame for each of pixels of the first frame and outputting edge enhancement image information; selecting the edge enhancement image information obtained by conducting the edge enhancement processing of the first frame for each of pixels of the first frame when an absolute value of the first difference is at least a predetermined value, and selecting image information of the first frame when the absolute value of the first difference is less than the predetermined value; computing a second difference between the edge enhancement image information or the image information of the first frame which is selected and the image information of the second frame; multiplying the second difference by an enhancement correction coefficient; adding together a result obtained by the multiplying and the image information of the second frame; and driving a liquid crystal panel on the basis of a result obtained by the adding.

DESCRIPTION OF THE EMBODIMENTS

Hereafter, an embodiment of the present invention will be described in detail with reference to the drawings.

Figure 1:
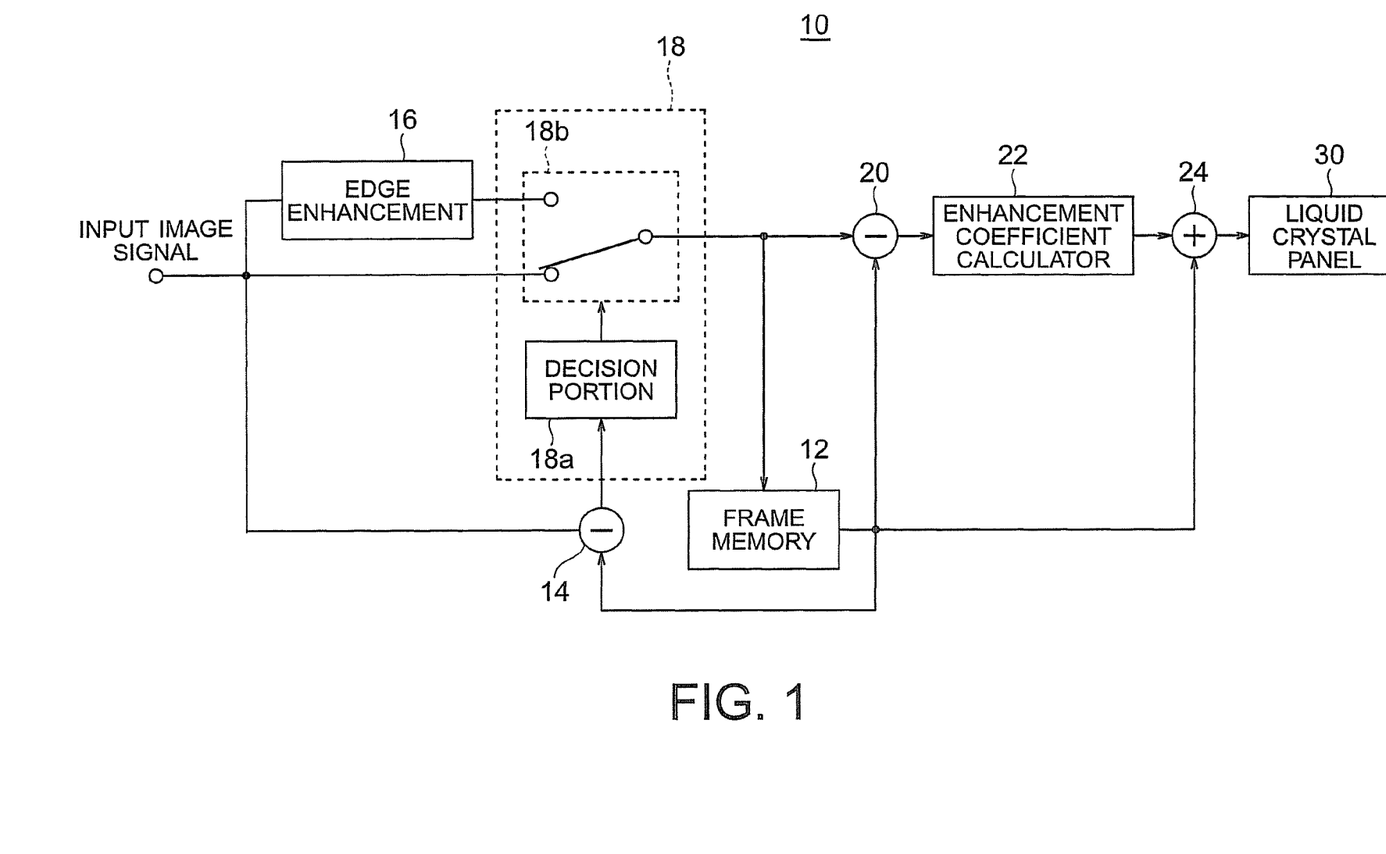
FIG. 1 is a block diagram showing a LCD apparatus according to an embodiment of the present invention.

A LCD (liquid crystal display) apparatus according to an embodiment of the present invention is shown in FIG. 1. A LCD apparatus 1 according to the present embodiment includes a liquid crystal drive device 10 and a liquid crystal panel 30. The liquid crystal drive device 10 includes a frame memory 12 for retaining respective gray scale levels of video signals (for example, color signals of R (red), G (green) and B (blue)) corresponding to one frame of an input image signal, a subtracter 14, an edge enhancement processor 16, a selector 18, a subtracter 20, an enhancement coefficient calculator 22, and an adder 24. The selector 18 includes a decision portion 18a and a switch portion 18b.

The gray scale levels (hereafter referred to as input image information) of respective video signals of the input image signal input to the LCD apparatus 1 are sent to the frame memory 12 and stored therein. At this time, the gray scale levels of respective video signals sent to the frame memory 12 are selectively subjected to edge emphasis processing in the edge enhancement processor 16 according to a result of selection in the selector 18 described later. The gray scale levels of respective video signals sent to the frame memory 12 are sent to the subtracter 14 and the selector 18. The subtracter 14 computes a difference between the gray scale levels (hereafter referred to as delayed image information as well) of the input image signal and gray scale levels of respective video signals of the image signal retained in the frame memory 2 and delayed by one frame, every pixel.

The edge enhancement processor 16 conducts the edge enhancement processing on the basis of results of subtraction conducted by the subtracter 14.

Figure 2:
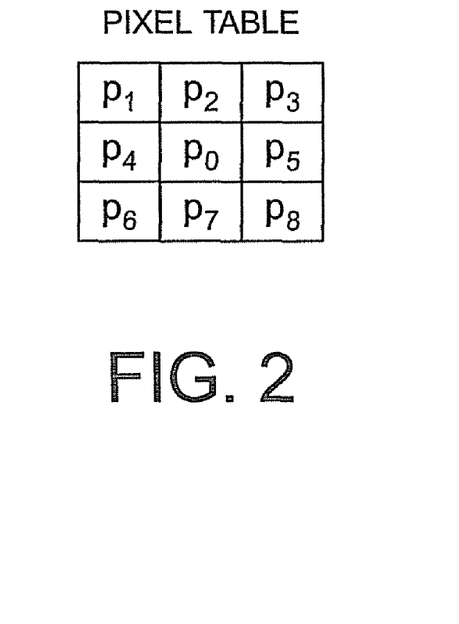
FIG. 2 is a diagram showing an image table used in edge enhancement processing.

This edge enhancement processing is conducted as hereafter described. An image signal value of a pixel in a location (i, j), i.e., a pixel in an ith row and a jth column is denoted by $p_0$. Image signal values in peripheral locations (i−1, j−1), (i−1, j), (i−1, j+1), (i, j−1), (i, j+1), (i+1, j−1), (i+1, j), (i+1, j+1) for the location (i, j) for the location (i, j) are denoted by $p_1, p_2, p_3, p_4, p_5, p_6, p_7$ and $p_8$, respectively. In other words, a pixel table shown in FIG. 2 is obtained.

Figure 3:
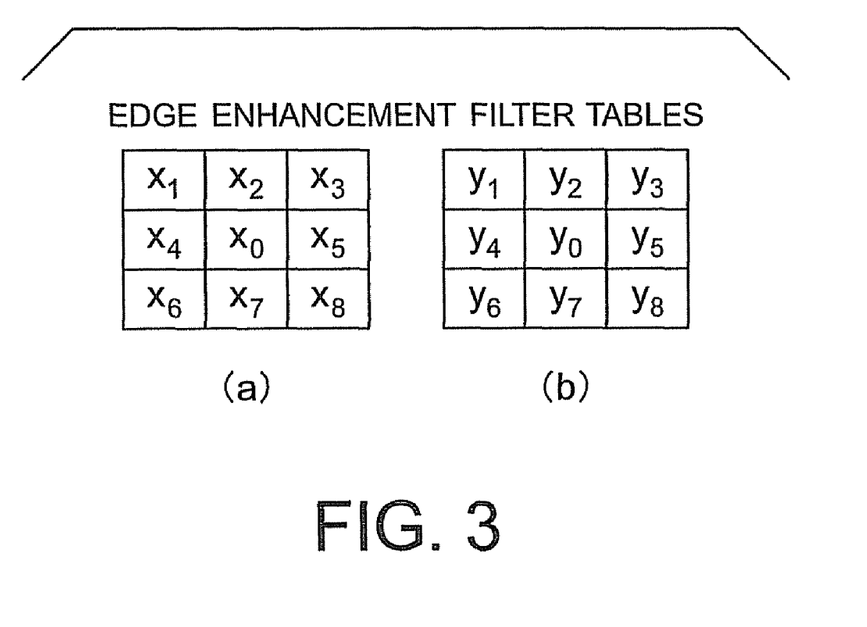
FIGS. 3(a) and 3(b) are diagrams showing edge enhancement filters.

Tables of edge enhancement filters in the x direction (lateral direction) and edge enhancement filters in the y direction (longitudinal direction) used in the edge enhancement processing are shown in FIG. 3(a) and 3(b), respectively. These tables of the edge enhancement filters correspond to the image table. If the image table is a 3×3 matrix as shown in FIG. 2, then each of the tables of the edge enhancement filters also becomes a 3×3 matrix. As shown in FIGS. 3(a) and (b), values of an edge enhancement filter in the x direction and an edge enhancement filter in the y direction corresponding to a central location (2, 2) are denoted by $x_0$ and $y_0$. And values of edge enhancement filters in the x direction corresponding to peripheral locations (1, 1), (1, 2), (1, 3), (2, 1), (2, 3), (3, 1), (3, 2) and (3, 3) for the location (2, 2) are denoted by $x_1, x_2, x_3, x_4, x_5, x_6, x_7$ and $x_8$. Values of edge enhancement filters in the y direction corresponding to peripheral locations (1, 1), (1, 2), (1, 3), (2, 1), (2, 3), (3, 1), (3, 2) and (3, 3) for the location (2, 2) are denoted by $y_1, y_2, y_3, y_4, y_5, y_6, y_7$ and $y_8$.

An image information value $P_{edge}(i, j)$ after the edge enhancement processing in a pixel location (i, j) is found according to the following Equation (1) or (2) by using the image table and the tables of the edge enhancement filters in the x direction and the y direction for them.

$$P_{edge}(i, j) = p_0 + amp \times \left\{ \left( \sum_{n=0}^{8} p_n \times x_n \right)^2 + \left( \sum_{n=0}^{8} p_n \times y_n \right)^2 \right\}^{\frac{1}{2}} \quad (1)$$

$$P_{edge}(i, j) = p_0 + amp \times \left( \left| \sum_{n=0}^{8} p_n \times x_n \right| + \left| \sum_{n=0}^{8} p_n \times y_n \right| \right) \quad (2)$$

Figure 4:
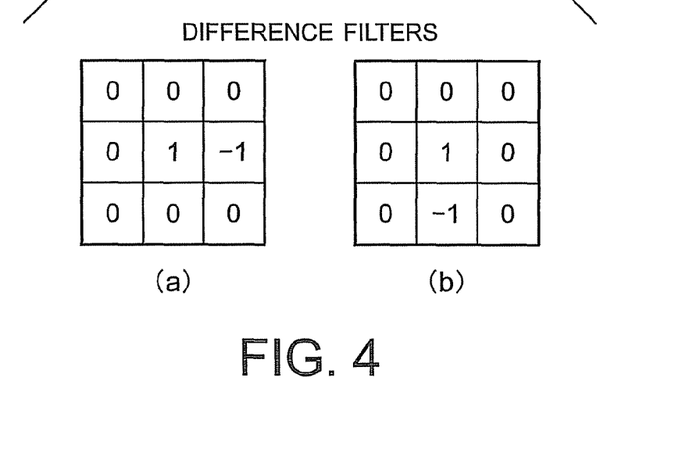
FIGS. 4(a) and 4(b) are diagrams showing difference filters.
Figure 5:
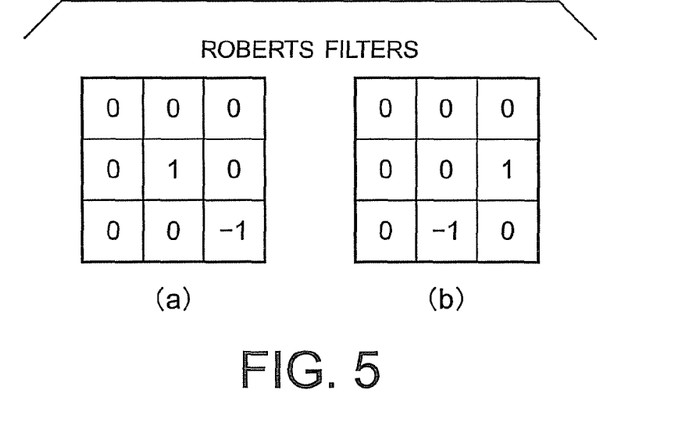
FIGS. 5(a) and 5(b) are diagrams showing the Roberts filters.
Figure 6:
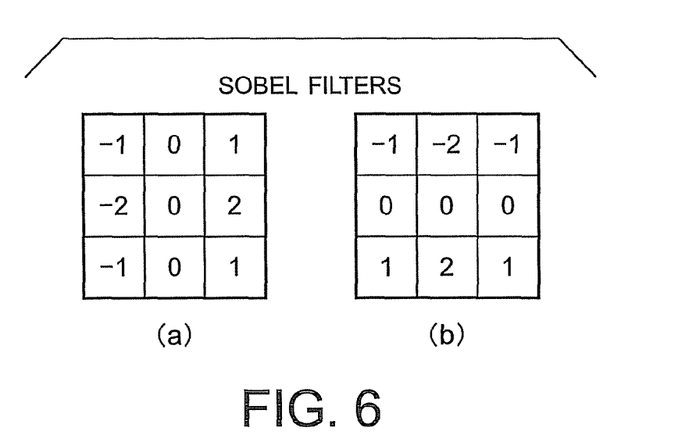
FIGS. 6(a) and 6(b) are diagrams showing the Sobel filters.
Figure 7:
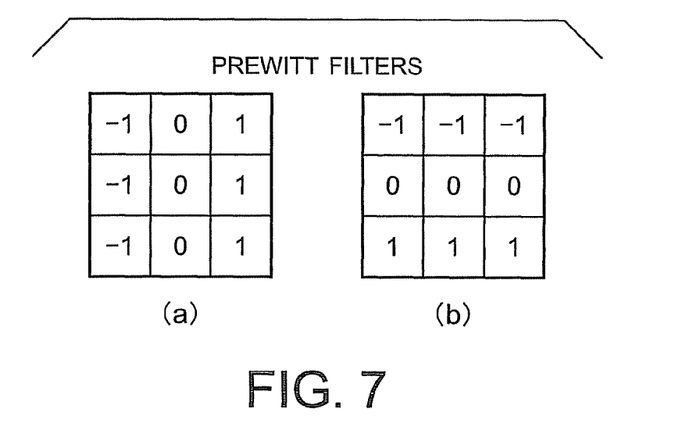
FIGS. 7(a) and 7(b) are diagrams showing the Prewitt filters.
Figure 8:
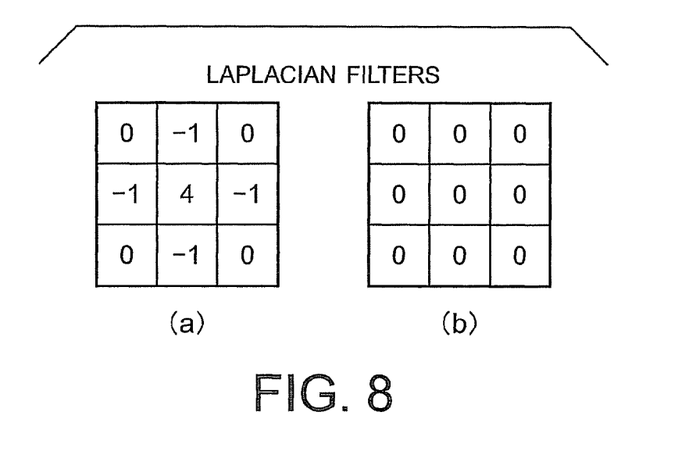
FIGS. 8(a) and 8(b) are diagrams showing the Laplacian filters.
Figure 9:
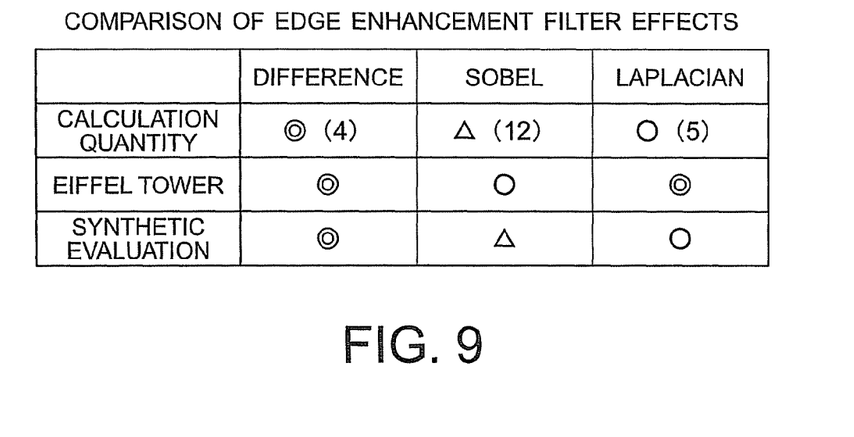
FIG. 9 is a diagram showing comparison of effects of edge enhancement filters of three kinds.

In Equations (1) and (2), "amp" is an edge intensity adjustment value for adjusting the edge intensity. The image information value $P_{edge}(i, j)$ after the edge enhancement processing is found for each pixel, and edge enhancement image information is generated. Examples of the edge enhancement filters used to find the edge enhancement image information are shown in FIG. 4(a) to FIG. 8(b). FIGS. 4(a) and 4(b) show difference filters in the x direction and the y direction, respectively. FIGS. 5(a) and 5(b) show the Roberts filters in the x direction and the y direction, respectively. FIGS. 6(a) and 6(b) show the Sobel filters in the x direction and the y direction, respectively. FIGS. 7(a) and 7(b) show the Prewitt filters in the x direction and the y direction, respectively. FIGS. 8(a) and 8(b) show the Laplacian filters in the x direction and the y direction, respectively. In order to study filters which are the most suitable for the edge enhancement processing in the present embodiment among them, effects of the edge enhancement filters will be compared as hereafter described. The difference filters and the Roberts filters, and the Prewitt filters and the Sobel filters are not different from each other in calculation quantity and are also similar in effect. Therefore, an image of the Eiffel Tower (not illustrated) is subjected to the edge enhancement processing by using the difference filters, the Sobel filters and the Laplacian filters, and their picture qualities are subjected to subjective evaluation. Results are shown in FIG. 9. As for effects, the difference filters and the Laplacian filters are the same in degree and the Sobel filters are slightly inferior. Among the filters of three kinds shown in FIG. 9, double circles indicate the best results. The single circles indicate the best results next to the double circles, and triangles indicated the best results next to the single circles. As appreciated from FIG. 9, it is desirable in the present embodiment to use the difference filters or the Roberts filters which are less in calculation quantity. In this way, the edge enhancement processor 16 finds edge enhancement image information every pixel.

Referring back to FIG. 1, operation of the liquid crystal drive device according to the present embodiment will now be described. The decision portion 18a in the selector 18 generates a control signal on the basis of the result of the subtraction conducted by the subtracter 14 to select an enhancement image information value subjected to the edge enhancement processing with respect to pixels having a motion (for example, an absolute value of the subtraction result value is not equal to 0 or is greater than a predetermined threshold) and select an input image information value with respect to pixels having no motions (for example, the absolute value of the subtraction result value is equal to 0 or equal to a predetermined threshold or less). The decision portion 18a sends the control signal to the switch portion 18b. As a result, the selector 18 selects the enhancement image information value subjected to the edge enhancement processing with respect to pixels having a motion, and selects the input image information value with respect to pixels having no motions. It is confirmed that a fine image is obtained by judging that there is no motion when the absolute value of the subtraction result value (difference value) is, for example, 50 or less in order to reduce noise. According to study conducted by the present inventors, the picture quality is the best when the value is in the range of 20 to 30.

In this way, the subtracter 20 computes a difference value ($=S_{select}-L_{memory}$) between an information value $S_{select}$ selected by the selector 18 and an image information value $L_{memory}$ of an immediately preceding frame stored in the frame memory 12. The enhancement coefficient calculator 22 multiplies the difference value ($=S_{select}-L_{memory}$) by the enhancement coefficient $\alpha$. The adder 24 adds together an output of the enhancement coefficient calculator 22 ($=\alpha(S_{select}-L_{memory})$) and the image information value $L_{memory}$ of the immediately preceding frame stored in the frame memory 12 to obtain enhancement image information $L_{\alpha edge}$. The enhancement image information $L_{\alpha edge}$ is found according to the following equation.

$$L_{\alpha edge}=\alpha(S_{select}-L_{memory})+L_{memory}$$

The enhancement image information $L_{\alpha edge}$ thus obtained is sent to the liquid crystal panel 30, and converted to a drive signal (for example, an enhancement image signal converted from a digital signal to an analog signal). The liquid crystal panel 30 is driven on the basis of the drive signal, and an image is displayed. A circuit which converts the enhancement image information $L_{\alpha edge}$ to the drive signal is provided in the liquid crystal panel 30 in the present embodiment. Alternatively, the circuit may be provided in the liquid crystal drive circuit 10.

By the way, the enhancement coefficient $\alpha$ is found as described hereafter. Responses between gray scale levels ($L_0$ (start gray scale level) and $L_1$ (goal gray scale level)) are measured beforehand, and a gray scale level arrived at one frame later (16.7 ms later in the case where the refresh rate of the LCD is 60 Hz) is found. From this, a write gray scale level $L_\alpha$ required to cause a change from a certain gray scale level to another gray scale level one frame later is found. The following relational equation holds true among $L_\alpha$, $L_0$ and $L_1$.

$$(L_\alpha-L_0)=\alpha(L_1-L_0)$$

If the LCD has 256 gray scale levels, 256×256 data are needed to store data between all gray scale levels. However, the number of data may be reduced by suitably conducting omission, i.e., by finding data every suitable number of gray scale levels such as eight gray scale levels or sixteen gray scale levels. Relations between $L_\alpha-L_0$ and $L_1-L_0$ can be approximated by using a function (for example, a straight line). Therefore, $L_1-L_0$ of found data is plotted on the abscissa and $L_\alpha-L_0$ is plotted on the ordinate. An approximation curve (or straight line) is calculated from the relations by using the least square method or the like. An inclination value at this time is adopted as the enhancement correction coefficient $\alpha$. When the enhancement correction coefficient $\alpha$ is represented by a binary number, typically, for example, approximately 16 bits follow a decimal point. By the way, as described in Japanese Patent Application 2007-221031 of the present inventors, display without picture quality degradation can be implemented even if the value of $\alpha$ is approximated by $(\beta+(\frac{1}{2}'')\times m)$ in order to reduce the calculation quantity. Here, n is 2 or 3, m is an integer which is at least 0 and less than $2^n$, and $\beta$ is an integer value of the enhancement correction coefficient $\alpha$. In other words, $\beta$ is a maximum integer value which does not exceed $\alpha$. If the enhancement correction coefficient $\alpha$ is thus approximated by $(\beta+(\frac{1}{2}'')\times m)$, the circuit scale of the enhancement coefficient calculator 22 can be reduced remarkably as described in Japanese Patent Application 2007-221031 as well. This is because a multiplier circuit is the greatest in circuit scale and it becomes possible to represent the enhancement correction coefficient with a smaller number of bits by using the approximated enhancement correction coefficient $\alpha$ in the enhancement coefficient calculator 22. As a result, it becomes possible to make the liquid crystal drive device including the subtracter 20, the enhancement coefficient calculator 22 and the adder 24 small. Even if the LCD apparatus according to the present embodiment is mounted on a device required to be light in weight and small in size, favorable motion picture characteristics are obtained.

If the edge intensity adjustment value "amp" is a multiple of $\frac{1}{2^k}$ (where k is a positive integer) when the edge enhancement processing is conducted by the edge enhancement processor 16, then the scale of the multiplier circuit in the edge enhancement processing can be reduced remarkably.

The present embodiment will be described further in detail with reference to examples.

First Example

Figure 10:
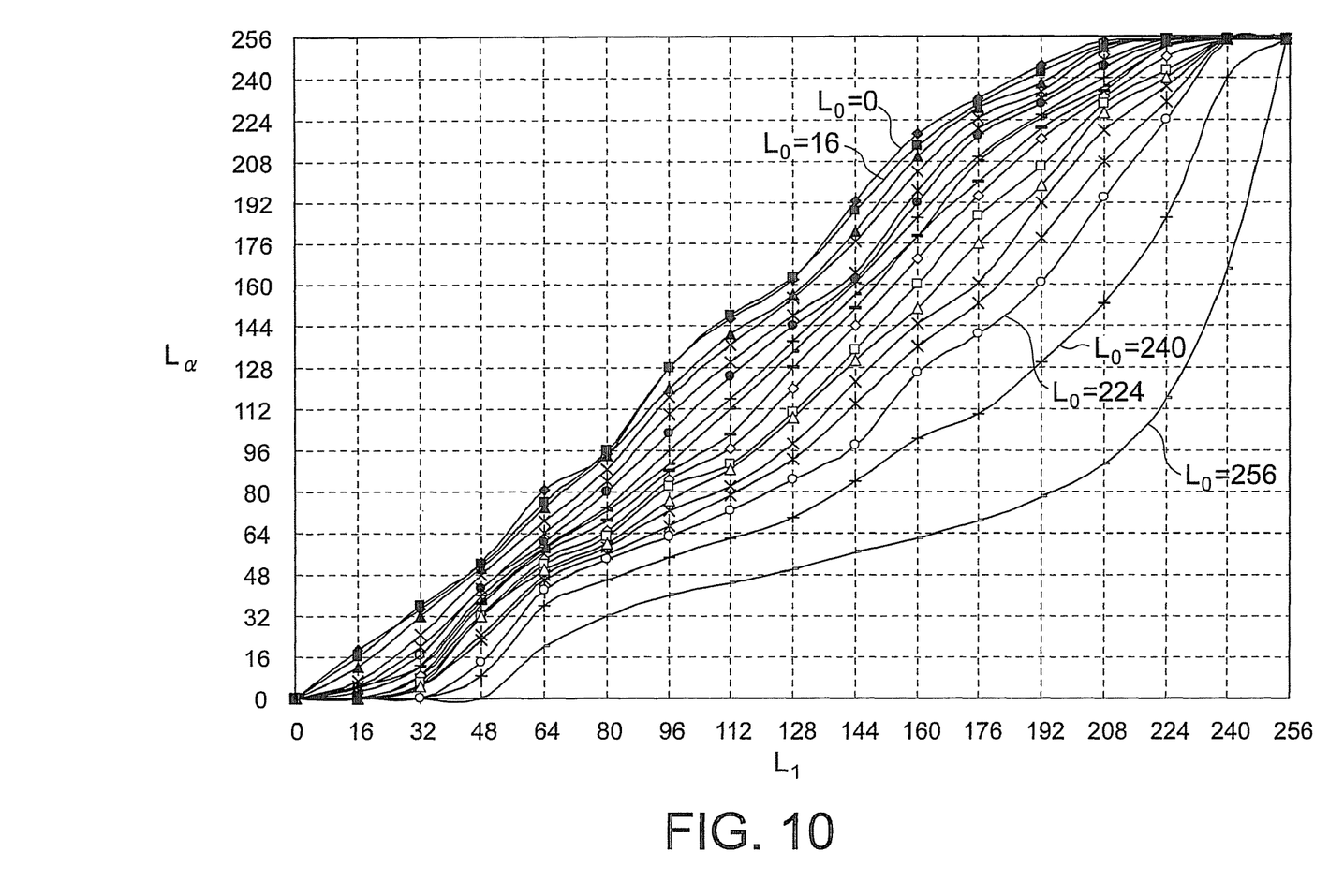
FIG. 10 is a diagram showing measurement results of characteristics of a LCD according to an example.
Figure 11:
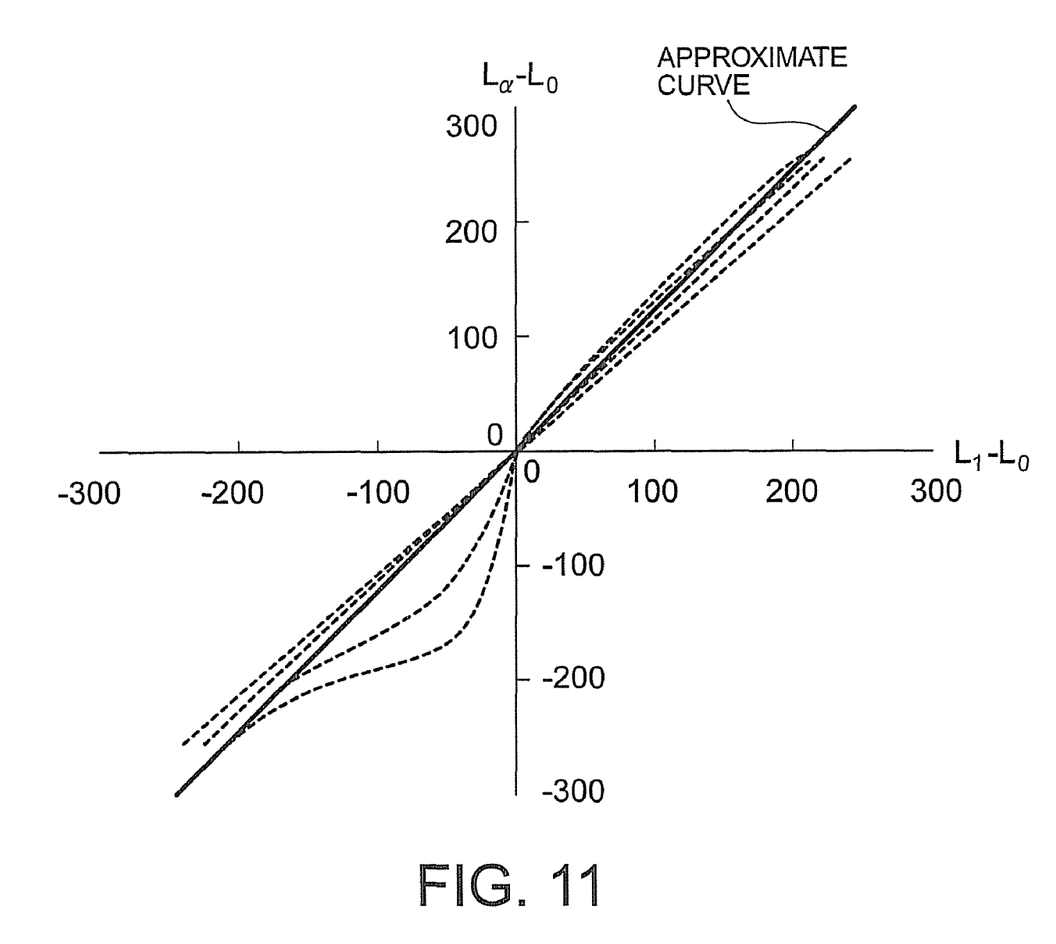
FIG. 11 is a graph for finding relations between $(L_\alpha - L_0)$ and $(L_1 - L_0)$ from measurement results shown in FIG. 4.

First, the enhancement correction coefficient $\alpha$ of a panel is found by using a portable liquid crystal panel of approximately 2 inches. Results of measurement conducted by using the start gray scale level $L_0$ as a parameter are shown in FIG. 10. This measurement is conducted by changing the start gray scale level $L_0$ from the gray scale level 0 to the gray scale level 256 at intervals of 16 gray scale levels. As the start gray scale level $L_0$ changes the gray scale level 0 to the gray scale level 256, a graph showing relations between the enhancement gray scale level $L_\alpha$ and the goal gray scale level $L_1$ changes gradually from the left to the right. Graphs obtained by plotting results of the measurement with the ordinate axis indicating $(L_\alpha-L_0)$ and the abscissa axis indicating $(L_1-L_0)$ are shown in FIG. 11. As appreciated from FIG. 11, $(L_\alpha-L_0)$ and $(L_1-L_0)$ are nearly in the linear relations. As a result of finding an approximate expression of the straight line by using the least square method, the inclination of the straight line is 1.24. In the present example, this value is used as the enhancement correction coefficient $\alpha$.

Subsequently, the difference filters shown in FIG. 4(a) and 4(b) are used as the edge enhancement filters. The edge enhancement processing using the difference filters is conducted as described hereafter. An image signal value in a location (i, j) is denoted by f(i, j), and a signal value after the enhancement is denoted by g(i, j). The signal value after the enhancement g(i, j) is calculated by using the following expression. Here, "amp" is the edge intensity adjustment value.

$$g(i,j)=f(i,j)+\{2\times f(i,j)-f(i+1,j)-f(i,j+1)\}\times \text{amp}$$

Figure 12:
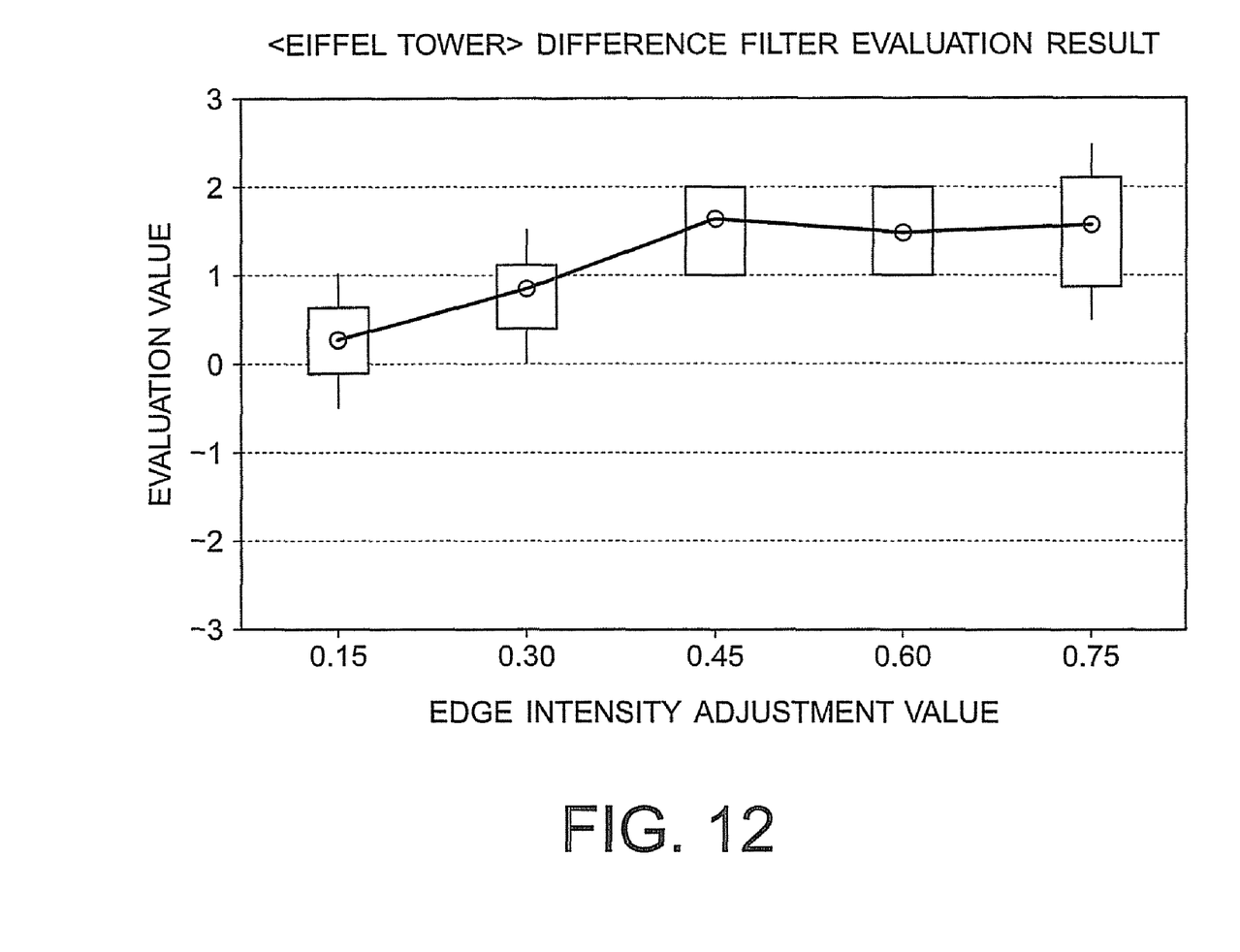
FIG. 12 is a diagram showing evaluation of an image obtained when an edge intensity adjustment value is changed.

As appreciated from the expression, the signal value after the enhancement can be adjusted by suitably adjusting the edge intensity adjustment value "amp". The present inventors have investigated the picture quality obtained when the magnitude of the edge intensity adjustment value "amp" and obtained results shown in FIG. 12. Although the optimum quantity of the "amp" is influenced by the edge enhancement filters and image as well, amp=0.6 is set on the basis of the results this time.

Subsequently, it is checked whether there is a motion in the image. Image information stored in the frame memory 2 is denoted by m(i, j). A difference d(i, j) between the input image information and the image information stored in the frame memory 2 is found.

$$d(i,j)=f(i,j)-m(i,j)$$

When an absolute value of d(i, j) is at least 25, it is judged that there is a motion and the signal value after the edge enhancement g(i, j) is selected. When the absolute value of d(i, j) is less than 25, it is judged that there are no motions and f(i, j) is selected. A signal value J(i, j) in the location (i, j) is thus determined.

Finally, enhancement drive processing is conducted. An output value L(i, j) is found according to the following equation.

$$L(i,j)=\alpha(J(i,j)-m(i,j))+m(i,j)$$

As a result of subjective evaluation conducted by ten subjects to compare the video image processed as heretofore described with the image processed without conducting the edge enhancement, it is found that the picture quality is improved.

First Comparative Example

An image subjected to enhancement processing by using the known technique described in USP Application 2006/0066554A1 is compared with an image subjected to the enhancement processing according to the present example. As a result, picture quality degradation such as highlight or a shadow occurs in a part of the image when the known technique is used. It is found that the degradation is improved in the image subjected to the enhancement processing according to the present example.

Second Example

An image obtained by conducting processing with the enhancement correction coefficient set equal to $(1+\frac{1}{2}^2=1.25)$ in the first example is compared with the image processed in the first example. A difference between those images cannot be discerned. The enhancement drive calculation circuit can be made small-sized by setting the enhancement correction coefficient equal to $1+\frac{1}{2}^2$.

As heretofore described, it becomes possible to make the computation processing simple in the present embodiment. Even in mobile devices required to be low in power dissipation, light in weight, and small in size, such as portable telephones, it becomes possible to display a high quality motion picture in the LCD apparatus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

What is claimed is:

1. A liquid crystal drive device comprising:
a frame memory configured to retain image information of a second frame, wherein the second frame is immediately preceding a first frame;
a first calculator configured to calculate a first difference between image information of the first frame and the image information of the second frame;
an edge enhancement processor configured to perform edge enhancement processing of the first frame for each of pixels of the first frame and outputting edge enhancement image information;
a selector configured to select and output the edge enhancement image information when an absolute value of an output of the first calculator is at least a predetermined value and which selects and outputs image information of the first frame when the absolute value of the output of the first calculator is less than the predetermined value;
a second calculator configured to calculate a second difference between an output of the selector and the image information of the second frame;
an enhancement coefficient calculator configured to multiply the second difference by an enhancement correction coefficient; and
a third calculator configured to calculate sum information by adding together an output of the enhancement coefficient calculator and the image information of the second frame,
wherein a liquid crystal panel is driven on the basis of the sum information.

2. The device according to claim 1, wherein the edge enhancement processor finds image information after edge enhancement at a subject pixel by using an image table including image information of the subject pixel and peripheral pixels around the subject pixel, edge enhancement filters, and an edge intensity adjustment value.

3. The device according to claim 2, wherein the edge intensity adjustment value is represented by a multiple of $\frac{1}{2}^k$, where k is a positive integer.

4. The device according to claim 2, wherein the edge enhancement filters are difference filters.

5. The device according to claim 1, wherein the enhancement correction coefficient is a value obtained by conducting linear approximation on relations between a gray scale level difference, which is a difference between the image information of the first frame and the image information of the second frame, and an enhancement gray scale level difference, which is a difference between enhancement image information for displaying the first frame on the liquid crystal panel and the image information of the second frame.

6. The device according to claim 5, wherein the enhancement correction coefficient obtained by conducting the linear approximation is represented by $(\beta+(\frac{1}{2}^n)\times m)$, where n is 2 or 3, m is an integer which is at least 0 and less than $2^n$, and $\beta$ is a maximum integer which does not exceed the enhancement correction coefficient obtained by conducting the linear approximation.

7. A liquid crystal display apparatus comprising:
a liquid crystal panel; and
the liquid crystal drive device according to claim 1 which drives the liquid crystal panel.

8. The apparatus according to claim 7, wherein the edge enhancement processor finds image information after edge enhancement at a subject pixel by using an image table including image information of the subject pixel and peripheral pixels around the subject pixel, edge enhancement filters, and an edge intensity adjustment value.

9. The apparatus according to claim 8, wherein the edge intensity adjustment value is represented by a multiple of $\frac{1}{2}^k$, where k is a positive integer.

10. The apparatus according to claim 8, wherein the edge enhancement filters are difference filters.

11. The apparatus according to claim 7, wherein the enhancement correction coefficient is a value obtained by conducting linear approximation on relations between a gray scale level difference, which is a difference between the image information of the first frame and the image information of the second frame, and an enhancement gray scale level difference, which is a difference between enhancement image information for displaying the first frame on the liquid crystal panel and the image information of the second frame.

12. The apparatus according to claim 11, wherein the enhancement correction coefficient obtained by conducting the linear approximation is represented by $(\beta+(1/2^n)\times m)$, where n is 2 or 3, m is an integer which is at least 0 and less than $2^n$, and $\beta$ is a maximum integer which does not exceed the enhancement correction coefficient obtained by conducting the linear approximation.

13. A drive method comprising:
  retaining image information of a second frame immediately preceding a first frame in a frame memory;
  computing a first difference between image information of the first frame and the image information of the second frame;
  conducting edge enhancement processing of the first frame for each of pixels of the first frame and outputting edge enhancement image information;
  selecting the edge enhancement image information obtained by conducting the edge enhancement processing of the first frame for each of pixels of the first frame when an absolute value of the first difference is at least a predetermined value, and selecting image information of the first frame when the absolute value of the first difference is less than the predetermined value;
  computing a second difference between the edge enhancement image information or the image information of the first frame which is selected and the image information of the second frame;
  multiplying the second difference by an enhancement correction coefficient;
  adding together a result obtained by the multiplying and the image information of the second frame; and
  driving a liquid crystal panel on the basis of a result obtained by the adding.

14. The method according to claim 13, wherein the edge enhancement processing finds image information after edge enhancement at a subject pixel by using an image table including image information of the subject pixel and peripheral pixels around the subject pixel, edge enhancement filters, and an edge intensity adjustment value.

15. The method according to claim 14, wherein the edge intensity adjustment value is represented by a multiple of $1/2^k$, where k is a positive integer.

16. The method according to claim 14, wherein the edge enhancement filters are difference filters.

17. The method according to claim 13, wherein the enhancement correction coefficient is a value obtained by conducting linear approximation on relations between a gray scale level difference, which is a difference between the image information of the first frame and the image information of the second frame, and an enhancement gray scale level difference, which is a difference between enhancement image information for displaying the first frame on the liquid crystal panel and the image information of the second frame.

18. The method according to claim 17, wherein the enhancement correction coefficient obtained by conducting the linear approximation is represented by $(\beta+(1/2^n)\times m)$, where n is 2 or 3, m is an integer which is at least 0 and less than $2^n$, and $\beta$ is a maximum integer which does not exceed the enhancement correction coefficient obtained by conducting the linear approximation.

* * * * *